Oct. 23, 1923.
P. A. FRIMAND
1,471,394
METHOD OF MILKING
Filed July 19, 1919
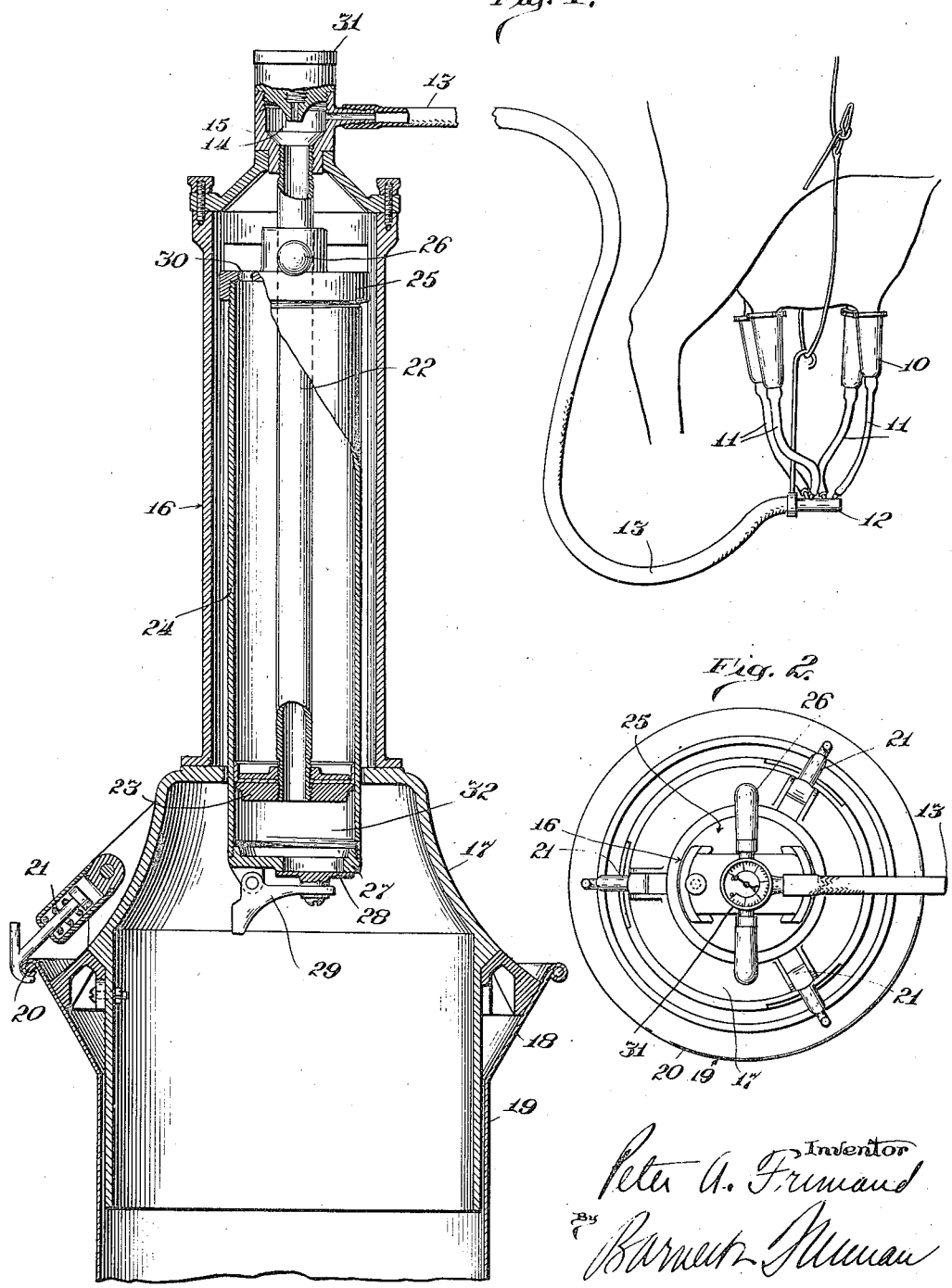

Patented Oct. 23, 1923.

1,471,394

UNITED STATES PATENT OFFICE.

PETER A. FRIMAND, OF MIAMI, FLORIDA, ASSIGNOR TO THE BURTON PAGE COMPANY, OF CHICAGO, ILLINOIS, A CORPORATION OF ILLINOIS.

METHOD OF MILKING.

Application filed July 19, 1919. Serial No. 311,934.

*To all whom it may concern:*

Be it known that I, PETER A. FRIMAND, a citizen of the United States, residing at Miami, in the county of Dade and State of Florida, have invented certain new and useful Improvements in Methods of Milking, of which the following is a specification.

My invention relates to the operation of milking cows by mechanically produced suction applied to the cow's teats intermittently; and the object of the invention is to provide a method of creating and applying the suction impulses controllably, in accordance with the peculiarities of the particular animal being milked. It is well known that some cows are harder to milk than others, requiring more intense vacuum to induce the flow of milk. Others are sensitive and are annoyed and perhaps injured by too strong a suction or by a suction created too rapidly. The ordinary processes of milking by machinery do not adapt themselves to these individual peculiarities and for that reason are objectionable. The mechanical method to be hereinafter described and claimed permits the intensity of the vacuum applied to the cow's udder, the length of the suction period and the rapidity with which the vacuum reaches its maximum intensity to be varied to suit the individual characteristics. In effect, the invention provides a milking operation closely simulating the natural process of milking by hand.

The invention is described but not claimed in my co-pending application filed October 16, 1915, Serial No. 56,294, and patented August 5, 1919, No. 1,311,959, entitled "Milking machine" of which this application is a continuation in part.

A suitable apparatus for practicing the method (substantially the same as is shown in my co-pending application) is illustrated in the accompanying drawing. The invention, however, is in no way limited to the use of this particular apparatus. The mechanical milking method, the subject of this application, might be practiced by use of machines very differently constructed from that shown, as will be obvious from the description of the process which follows.

In the drawing,

Fig. 1 is a sectional elevation of the apparatus, and

Fig. 2 is a plan view of the same.

In the drawing I have shown the milking machine as seated upon and attached to the top of the ordinary milk can, the machine comprising a pump of which the piston is stationary and the cylinder reciprocable. So far as the method is concerned these arrangements are purely optional.

In this illustrative construction the teat cups 10 are connected by tubes 11 to a manifold 12 from which leads a flexible tube 13 to a space 14 in a casing 15 supported by uprights 16 upon the base member 17 of the apparatus which fits into the flaring top 18 of a milk can 19, the base being preferably held to the beaded edge 20 of the milk can by means of spring clips 21. Secured to the under side of casing 15 and communicating with the space 14 is a hollow piston rod 22 to the lower end of which is fixed a piston 23. This piston cooperates with a reciprocating cylinder 24 having a head 25 provided with handles 26 by means of which the cylinder is operated. The lower head 27 of the cylinder is formed with a milk outlet 28 normally closed by a weighted valve 29. The upper head 25 is formed with an air escape port 30.

It is important that the stroke of the pump be comparatively long, as has been shown, in order that one may obtain the control and regulation of the suction impulses to be referred to. It is also desirable that a gauge be provided, within sight of the operator, to indicate the vacuum developed against the cow's udder for the guidance of the operator. Such vacuum gauge is indicated at 31.

The commonest form of milking machine provides for the creation of a constant vacuum and the application of this vacuum intermittently to the cow by a pulsator. Another form of milking machine used to a certain extent, provides for a reciprocating pump operating directly against the cow's udder but driven by a motor. In both types of mechanical milking methods exemplified by these machines the suction impulses are uniform. They are not adjusted and varied to meet the requirements of individual animals. In accordance with my method the pump is operated by hand or otherwise so as to be directly moved and controlled by the milker, the operation being as follows:

The moving member of the pump, a cylinder in the apparatus here shown, is moved down at first rapidly so as to develop almost immediately a suction of the desired maximum, which, of course, may be varied in accordance with peculiarities of the animal being milked. This induces flow of milk. As soon as this flow starts the operator pushes down the movable member of the pump slowly, just sufficiently, in fact, to maintain the vacuum at a substantially uniform intensity. The vacuum is then relieved by the upstroke of the movable member of the pump. This forces the milk from the space between the fixed piston 23 and the lower head 27 of the cylinder, valve 29 opening to allow the milk to discharge into the milk can below.

I claim:

1. Method of milking by mechanically created suction applied intermittently to the cow's teats which consists in developing a vacuum at each pulsation so that it quickly reaches the maximum intensity desired, then continuing the exhausting operation just sufficiently to maintain the intensity of the vacuum substantially constant for a time, and then relieving the vacuum so that the cow's teats are subject to atmospheric pressure and discharging the milk accumulated in the vacuum space.

2. Method of milking by mechanically created suction applied intermittently to the teat which consists in maintaining the vacuum created at each suction period at a milking intensity substantially constant for a considerable portion of the period and then relieving the vacuum to give a period of rest at substantially atmospheric pressure before the next suction period.

3. Method of operating a milking machine of the intermittent suction type in which the suction pulsations are produced by action of a reciprocating pump, which consists in operating the pump at each suction period to first develop quickly a milking vacuum on the teat of maximum intensity, then maintain said vacuum at substantially constant intensity for the major portion of the suction period and thereafter relieve the vacuum so as to give a period of rest at substantially atmospheric pressure between each suction period.

PETER A. FRIMAND.